US009969901B2

(12) United States Patent
Kuriyama et al.

(10) Patent No.: US 9,969,901 B2
(45) Date of Patent: May 15, 2018

(54) AQUEOUS RESIN COMPOSITION, LAMINATE PRODUCED USING SAME, AND IMAGE DISPLAY DEVICE

(71) Applicant: DIC Corporation, Tokyo (JP)

(72) Inventors: Chisato Kuriyama, Osaka (JP); Kenji Nagao, Osaka (JP); Mitsuru Kitada, Osaka (JP)

(73) Assignee: DIC CORPORATION, Tokyo (JP)

( * ) Notice: Subject to any disclaimer, the term of this patent is extended or adjusted under 35 U.S.C. 154(b) by 79 days.

(21) Appl. No.: 14/910,550

(22) PCT Filed: Jul. 29, 2014

(86) PCT No.: PCT/JP2014/069913
§ 371 (c)(1),
(2) Date: Feb. 5, 2016

(87) PCT Pub. No.: WO2015/019899
PCT Pub. Date: Feb. 12, 2015

(65) Prior Publication Data
US 2016/0177127 A1    Jun. 23, 2016

(30) Foreign Application Priority Data
Aug. 6, 2013  (JP) .................................. 2013-163192

(51) Int. Cl.
| C09D 175/06 | (2006.01) |
| C09D 151/08 | (2006.01) |
| C09D 5/00 | (2006.01) |
| C09D 5/02 | (2006.01) |
| C09D 163/10 | (2006.01) |
| C09D 175/04 | (2006.01) |
| C08G 18/66 | (2006.01) |
| C08G 18/76 | (2006.01) |
| C08G 18/08 | (2006.01) |
| C09D 175/16 | (2006.01) |
| C08G 18/32 | (2006.01) |
| C08G 18/42 | (2006.01) |
| C08L 63/10 | (2006.01) |

(52) U.S. Cl.
CPC ....... *C09D 175/06* (2013.01); *C08G 18/0823* (2013.01); *C08G 18/3215* (2013.01); *C08G 18/4202* (2013.01); *C08G 18/4211* (2013.01); *C08G 18/4238* (2013.01); *C08G 18/6659* (2013.01); *C08G 18/7621* (2013.01); *C08L 63/10* (2013.01); *C09D 5/00* (2013.01); *C09D 5/002* (2013.01); *C09D 5/02* (2013.01); *C09D 151/08* (2013.01); *C09D 163/10* (2013.01); *C09D 175/04* (2013.01); *C09D 175/16* (2013.01)

(58) Field of Classification Search
CPC ....... C08L 75/04; C08L 63/10; C09D 163/10; C09D 151/08; C09D 175/04; C09D 175/06; C09D 175/16; C09D 5/00; C09D 5/002; C09D 5/02; C08G 18/12; C08G 18/282; C08G 18/0823; C08G 18/3215; C08G 18/4202; C08G 18/4211; C08G 18/4238; C08G 18/6659; C08G 18/7621; Y10T 428/31551
USPC ....................................... 428/423.1; 522/109
See application file for complete search history.

(56) References Cited

U.S. PATENT DOCUMENTS

| 6,420,477 B1 * | 7/2002 | Hamamura ........... C08F 290/14 427/372.2 |
| 2006/0102051 A1 * | 5/2006 | Tanaka ................. C08F 290/067 106/218 |
| 2009/0053530 A1 | 2/2009 | Sommer et al. |
| 2012/0238659 A1 * | 9/2012 | Takigawa ........... C08G 18/6659 522/144 |
| 2012/0315485 A1 | 12/2012 | Iwazumi et al. |
| 2015/0224742 A1 * | 8/2015 | Inoue ................. B29C 45/14311 428/687 |

FOREIGN PATENT DOCUMENTS

| JP | 06001940 A | * | 1/1994 |
| JP | 2002-60282 A | | 2/2002 |
| JP | 2003-342344 A | | 12/2003 |
| JP | 2010-215843 | | 9/2010 |
| JP | 2010-535909 A | | 11/2010 |
| JP | 2012-63773 A | | 3/2012 |
| JP | 2012-92311 A | | 5/2012 |
| JP | 2013-527863 A | | 7/2013 |

OTHER PUBLICATIONS

International Search Report PCT/JP2014/069913 dated Sep. 16, 2014 with English translation.

* cited by examiner

*Primary Examiner* — Thao T Tran
(74) *Attorney, Agent, or Firm* — McDermott Will & Emery LLP

(57) ABSTRACT

Provided is an aqueous resin composition in which a vinyl ester resin and a urethane resin having an aromatic ring are dispersed in an aqueous medium, in which the vinyl ester resin is obtained by allowing at least one epoxy resin selected from the group consisting of a novolak type epoxy resin and a bisphenol type epoxy resin to react with a compound having an acid group and a polymerizable unsaturated group, and the urethane resin is obtained by allowing polyol containing polyol having an aromatic ring and polyol having a hydrophilic group to react with a polyisocyanate. A primer using the aqueous resin composition is able to considerably improve adhesiveness between a substrate and a cured coating film of an active energy ray curable composition, even when the substrate is a sparingly adhesive substrate.

11 Claims, No Drawings

AQUEOUS RESIN COMPOSITION, LAMINATE PRODUCED USING SAME, AND IMAGE DISPLAY DEVICE

CROSS-REFERENCE TO RELATED APPLICATIONS

This Application is the U.S. National Phase of PCT/JP2014/069913 filed Jul. 29, 2014, which claims priority to Japanese Patent Application No. 2013-163192 filed Aug. 6, 2013. The subject matter of each is incorporated herein by reference in entirety.

TECHNICAL FIELD

The present invention relates to an aqueous resin composition which is able to be used as a primer which improves adhesiveness between a substrate and a cured coating film at the time of forming the cured coating film of an active energy ray curable composition on the surface of the substrate, a laminate produced using the aqueous resin composition, and an image display device.

BACKGROUND ART

Recently, an aqueous urethane resin composition has been investigated to be applied to a film or a sheet for optical application. Specifically, examples of the optical application include a liquid crystal display, a touch panel, and the like. In general, a display device such as a liquid crystal display has a configuration in which a plurality of optical films having various functions are laminated for displaying a clear image, and examples of such an optical film include an antireflection film, a retardation film, a prism lens sheet, and the like.

A polyester film, in particular, a polyethylene terephthalate (PET) film is used as a substrate of such an optical film from the viewpoint of excellent optical properties, mechanical strength, and durability. In addition, in the optical application, a prism sheet is prepared by forming a hard coat layer by applying an active energy ray curable composition onto the surface of the polyester film and curing the active energy ray curable composition or by disposing a layer which is formed by casting an active energy ray curable composition, but since the polyester film has a high crystallinity there is a problem that adhesiveness with respect to the a cured coating film of the active energy ray curable composition is deteriorated.

As a method for improving adhesiveness between a polyester film and a cured coating film of an active energy ray curable composition, a method in which a primer layer formed of an acrylic resin is disposed between the polyester film which is a substrate and the cured coating film of the active energy ray curable composition has been proposed (for example, refer to PTL 1). However, even when the primer layer formed of the acrylic resin is disposed, adhesiveness between the polyester film and the cured coating film of the active energy ray curable composition is not sufficient.

Therefore, a material which is able to be used in the primer layer for providing sufficient adhesiveness between the polyester film and the cured coating film of the active energy ray curable composition has been required.

CITATION LIST

Patent Literature

[PTL 1] JP-A-2010-215843

SUMMARY OF INVENTION

Technical Problem

An object of the present invention is to provide an aqueous resin composition which is able to be used as a primer for considerably improving adhesiveness between a substrate and a cured coating film of an active energy ray curable composition, even when the substrate is a sparingly adhesive substrate such as a polyester film, a laminate produced using the aqueous resin composition, and an image display device.

Solution to Problem

As a result of intensive studies of the present inventors for attaining the object described above, it has been found that an aqueous resin composition in which a vinyl ester resin obtained by allowing a specific epoxy resin to react with a compound having an acid group and a polymerizable unsaturated group, and a urethane resin having an aromatic ring are dispersed in an aqueous medium is used as a primer, and thus, adhesiveness between a substrate and a cured coating film of an active energy ray curable composition is considerably improved, even when the substrate is a sparingly adhesive substrate such as a polyester film, and the present invention has been completed.

That is, the present invention relates to an aqueous resin composition in which a vinyl ester resin (A) and a urethane resin (B) having an aromatic ring are dispersed in an aqueous medium (C), in which the vinyl ester resin (A) is obtained by allowing at least one epoxy resin (a1) selected from the group consisting of a novolak type epoxy resin and a bisphenol type epoxy resin to react with a compound (a2) having an acid group and a polymerizable unsaturated group, and the urethane resin (B) is obtained by allowing polyol (b1) containing polyol (b1-1) having an aromatic ring and polyol (b1-2) having a hydrophilic group to react with polyisocyanate (b2), a laminate produced using the aqueous resin composition, and an image display device.

Advantageous Effects of Invention

The aqueous resin composition of the present invention is able to be used as a primer for considerably improving adhesiveness between a substrate and a cured coating film of an active energy ray curable composition, even when the substrate is a sparingly adhesive substrate such as a polyester film, and thus, is suitable for a laminate in which the polyester film is used as a substrate, and the cured coating film of the active energy ray curable composition is formed on the surface of the substrate. Examples of such a laminate include an optical film such as an antireflection film, a retardation film, and a prism lens sheet. In addition, the optical film is able to be applied to an image display device such as a liquid crystal display.

DESCRIPTION OF EMBODIMENTS

An aqueous resin composition of the present invention is an aqueous resin composition in which a vinyl ester resin (A) and a urethane resin (B) having an aromatic ring are dispersed in an aqueous medium (C).

The vinyl ester resin (A) is obtained by allowing at least one epoxy resin (a1) selected from the group consisting of a novolak type epoxy resin and a bisphenol type epoxy resin to react with a compound (a2) having an acid group and a polymerizable unsaturated group.

The polymerizable unsaturated group of the compound (a2) is not involved in the reaction with respect to the epoxy resin, and thus, the vinyl ester resin (A) has a polymerizable unsaturated group derived from the compound (a2). The polymerizable unsaturated group of the vinyl ester resin (A) is polymerized with a polymerizable unsaturated group of a resin or a monomer contained in an active energy ray curable composition described below and forms a covalent bond, and thus, adhesion with respect to a primer layer formed of the aqueous resin composition of the present invention becomes strong.

It is preferable that the equivalent of the polymerizable unsaturated group of the vinyl ester resin (A) is in a range of 250 to 2,000 g/eq.

The epoxy resin (a1) is one or more selected from the group consisting of a novolak type epoxy resin and a bisphenol type epoxy resin, and specifically, the following resins are able to be used.

Examples of the novolak type epoxy resin include a cresol novolak type epoxy resin, a phenol novolak type epoxy resin, and the like. In addition, examples of the bisphenol type epoxy resin include a bisphenol A type epoxy resin, a bisphenol F type epoxy resin, a bisphenol AD type epoxy resin, a bisphenol S type epoxy resin, a tetrabromobisphenol A type epoxy resin, and the like. One type of the epoxy resin (a1) is able to be independently used, or two or more types thereof are able to be used in combination.

Among the epoxy resins (a1), the novolak type epoxy resin having a plurality of epoxy groups which are able to react with the acid group of the compound (a2) is preferably used.

In addition, epoxy equivalent of the epoxy resin (a1) is preferably in a range of 150 to 2,000 g/eq., and is more preferably in a range of 160 to 1,000 g/eq.

Further, it is preferable that 80 to 100 mol % of the total amount of the epoxy groups of the epoxy resin (a1) reacts with the acid groups of the compound (a2), and it is more preferable that all of the epoxy groups react with the acid groups of the compound (a2).

The compound (a2) has an acid group and a polymerizable unsaturated group. The acid group of the compound (a2) reacts with the epoxy group of the epoxy resin (a1), and thus, is able to introduce a polymerizable unsaturated group into the vinyl ester resin (A).

Examples of the compound (a2) include an acrylic acid, a methacrylic acid, an itaconic acid, 2-acryloyl oxy ethyl succinate, 2-methacryloyl oxy ethyl succinate, 2,2,2-trisacryloyl oxy methyl ethyl phthalate, and the like. Among the compounds, the acrylic acid which is able to introduce an acryloyl group easily polymerized with the polymerizable unsaturated group of the resin or the monomer in the active energy ray curable composition described below into the vinyl ester resin (A) is preferable. In addition, one type of the compound (a2) is able to be independently used or two or more types thereof are able to be used in combination, and it is preferable that the acrylic acid is used in the amount of greater than or equal to 50 mass % in the total amount of the compound (a2).

A reaction temperature of the epoxy resin (a1) and the compound (a2) is preferably in a range of 60 to 150° C., and is more preferably in a range of 80 to 120° C.

In addition, when the epoxy resin (a1) reacts with the compound (a2), it is preferable that a polymerization inhibitor is used in order to prevent thermal polymerization of the polymerizable unsaturated group of the compound (a2). It is preferable that the added amount of the polymerization inhibitor is in a range of 500 to 5000 ppm with respect to the total mass of the epoxy resin (a1) and the compound (a2).

Examples of the polymerization inhibitor include 2,6-bis (tert-butyl)-4-methyl phenol, hydroquinone, methyl hydroquinone, hydroquinone monomethyl ether (methoquinone), p-tert-butyl catechol, nitrobenzene, a nitrobenzoic acid, o-dinitrobenzene, m-dinitrobenzene, p-dinitrobenzene, 2,4-dinitrophenol, trinitrobenzene, and the like. One type of the polymerization inhibitor is able to be independently used or two or more types thereof are able to be used in combination.

Further, when the epoxy resin (a1) reacts with the compound (a2), a reaction catalyst is able to be used. It is preferable that the use amount of the reaction catalyst is in a range of 0.1 to 5 parts by mass with respect to 100 parts by mass of the epoxy resin (a1).

Examples of the reaction catalyst include an amine catalyst, an imidazole catalyst, a phosphorous catalyst, a boron catalyst, a phosphorous-boron catalyst, and the like. Specifically, alkyl substituted guanidine such as ethyl guanidine, trimethyl guanidine, phenyl guanidine, and diphenyl guanidine; 3-substituted phenyl-1,1-dimethyl urea such as 3-(3, 4-dichlorophenyl)-1,1-dimethyl urea, 3-phenyl-1,1-dimethyl urea, and 3-(4-chlorophenyl)-1,1-dimethyl urea; imidazoline such as 2-methyl imidazoline, 2-phenyl imidazoline, 2-undecyl imidazoline, and 2-heptadecyl imidazoline; monoaminopyridine such as 2-aminopyridine; amine imide such as N,N-dimethyl-N-(2-hydroxy-3-allyloxy propyl) amine-N'-lactaimide; an organic phosphorous catalyst such as ethyl phosphine, propyl phosphine, butyl phosphine, phenyl phosphine, trimethyl phosphine, triethyl phosphine, tributyl phosphine, trioctyl phosphine, triphenyl phosphine, tricyclohexyl phosphine, a triphenyl phosphine-triphenyl borane complex, and tetraphenyl phosphonium tetraphenyl borate, a diazabicycloundecene catalyst such as 1,8-diazabicyclo[5.4.0] undecene-7 and 1,4-diazabicyclo[2.2.2] octane, and the like. One type of the reaction catalyst is able to be independently used, or two or more types thereof are able to be used in combination.

The weight average molecular weight of the vinyl ester resin (A) to be used in the method described above is preferably in a range of 500 to 10,000, and is more preferably in a range of 1,000 to 6,000, from the viewpoint of improving dispersion stability of resin particles.

The urethane resin (B) having an aromatic ring is obtained by allowing polyol (b1) containing polyol (b1-1) having an aromatic ring and polyol (b1-2) having a hydrophilic group to react with a polyisocyanate (b2).

The polyol (b1-1) is used as a raw material of the urethane resin (B), and thus, the urethane resin (B) has an aromatic ring. In addition, the concentration of the aromatic ring in the polyol (b1-1) is preferably in a range of 1.5 to 8 mol/kg, and is more preferably in a range of 1.6 to 5 mol/kg.

Examples of the polyol (b1-1) include aromatic polyester polyol, aromatic polycarbonate polyol, aromatic polyether polyol, an alkylene oxide adduct of bisphenol, and the like. One type of the polyol is able to be independently used, or two or more types thereof are able to be used in combination.

In addition, among the polyols (b1-1), the aromatic polyester polyol and an alkylene oxide adduct of bisphenol A which is one of the alkylene oxide adducts of the bisphenol are preferable from the viewpoint of excellent substrate adhesiveness and blocking resistance. Therefore, it is preferable that polyol containing at least one of the aromatic polyester polyol and the alkylene oxide adduct of the bisphenol A is used as the polyol (b1-1).

The aromatic polyester polyol is obtained by performing an esterification reaction between a polycarboxylic acid and polyhydric alcohol, and aromatic polyester polyol having an aromatic ring in at least one of the polycarboxylic acid and the polyol is used.

Examples of the polycarboxylic acid having an aromatic ring include an aromatic dicarboxylic acid such as a phthalic acid, an isophthalic acid, a terephthalic acid, and a naphthalene dicarboxylic acid or an esterification product thereof. In addition, examples of the polycarboxylic acid not having an aromatic ring include an aliphatic dicarboxylic acid such as a succinic acid, a glutaric acid, an adipic acid, a maleic acid, a pimelic acid, a suberic acid, an azelaic acid, an itaconic acid, a sebacic acid, a chlorendic acid, a 1,2,4-butane-tricarboxylic acid, a decane dicarboxylic acid, a cyclohexane dicarboxylic acid, a dimer acid, and a fumaric acid or an esterification product thereof. One type of the polycarboxylic acid or the esterification product thereof is able to be independently used, or two or more types thereof are able to be used in combination.

Examples of the polyhydric alcohol having an aromatic ring include aromatic diol such as benzene dimethanol, toluene dimethanol, and xylene dimethanol. In addition, examples of the polyhydric alcohol not having an aromatic ring include aliphatic polyol such as ethylene glycol, propylene glycol, 1,3-propylenediol, 1,4-butanediol, 1,6-hexanediol, 1,8-octanediol, diethylene glycol, triethylene glycol, cyclohexane-1,4-diol, cyclohexane-1,4-dimethanol, and neopentyl glycol ethylene glycol. One type of the polyhydric alcohol is able to be independently used, or two or more types thereof are able to be used in combination.

The polyol (b1-2) is polyol having a hydrophilic group. Examples of the hydrophilic group include an anionic group, a cationic group, and a nonionic group, among the hydrophilic groups, the anionic group is preferable, and among the anionic groups, a carboxyl group and a sulfone acid group are preferable.

Examples of the polyol having a carboxyl group as the hydrophilic group include a 2,2-dimethylol propionic acid, a 2,2-dimethylol butanoic acid, a 2,2-dimethylol valeric acid, and the like. Among them, the 2,2-dimethylol propionic acid is preferable. In addition, polyester polyol having a carboxyl group which is obtained by allowing the polyol having a carboxyl group to react with a polycarboxylic acid is able to be used.

Examples of the polyol having a sulfone acid group as the hydrophilic group include polyester polyol or the like which is obtained by allowing a dicarboxylic acid such as a 5-sulfoisophthalic acid, a sulfoterephthalic acid, a 4-sulfophthalic acid, and a 5-(4-sulfophenoxy)isophthalic acid or a salt thereof to react with low molecular polyol such as ethylene glycol, propylene glycol, 1,4-butanediol, 1,6-hexanediol, diethylene glycol, and neopentyl glycol.

It is preferable that a part or all of the anionic group is neutralized by a basic compound or the like since excellent water dispersibility is able to be imparted to the urethane resin (B).

Examples of the basic compound include ammonia; organic amine such as triethyl amine, morpholine, monoethanol amine, and diethyl ethanol amine; a metal hydroxide such as sodium hydroxide, potassium hydroxide, and lithium hydroxide, and the like. From the viewpoint of enabling water dispersion stability of the aqueous resin composition of the present invention to be further improved, the use amount of the basic compound is preferably in a range of 0.5 to 3, and is more preferably in a range of 0.7 to 1.5, in a molar ratio [Basic Compound/Anionic Group] of the basic compound and the anionic group.

In an esterification reaction for preparing the aromatic polyester polyol, in order to accelerate the esterification reaction, it is preferable that an esterification catalyst is used. Examples of the esterification catalyst include a metal such as titanium, tin, zinc, aluminum, zirconium, magnesium, hafnium, and germanium; a metal compound such as titanium tetraisopropoxide, titanium tetrabutoxide, titanium oxy acetyl acetate, dibutyl tin oxide, dibutyl tin diacetate, dibutyl tin dilaurate, tin octanate, 2-ethyl hexane tin, zinc acetyl acetonate, zirconium tetrachloride, a zirconium tetrachloride tetrahydrofuran complex, hafnium tetrachloride, a hafnium tetrachloride tetrahydrofuran complex, germanium oxide, tetraethoxy germanium, and the like.

The alkylene oxide adduct of the bisphenol A is obtained by adding alkylene oxide to a phenolic hydroxyl group of the bisphenol A. Examples of the alkylene oxide include ethylene oxide, propylene oxide, and the like. In addition, the average addition mole number of the alkylene oxide with respect to 1 mol of the bisphenol A is preferably in a range of 1 to 8, and is more preferably in a range of 1 to 4.

In the present invention, the polyol (b1) contains the polyol (b1-1) and the polyol (b1-2) as an essential component, and may contain polyol (b1-3) other than the polyol (b1-1) and the polyol (b1-2). Examples of the polyol (b1-3) include aliphatic polyester polyol, aliphatic polycarbonate polyol, aliphatic polyether polyol, an alkylene oxide adduct of hydrogenated bisphenol, and the like. In addition, the polyhydric alcohol exemplified as a raw material of the aromatic polyester polyol may be used as the polyol (b1-3). One type of the polyol (b1-3) is able to be independently used, or two or more types thereof are able to be used in combination.

In addition, a ratio of the polyol (b1-1) having an aromatic ring contained in the polyol (b1) is preferably in a range of 40 to 98 mass %, and is more preferably in a range of 60 to 98 mass %, from the viewpoint of further improving adhesiveness with respect to a substrate.

Examples of the polyisocyanate (b2) which is the raw material of the urethane resin (B) include an aromatic polyisocyanate such as 4,4'-diphenyl methane diisocyanate, 2,4'-diphenyl methane diisocyanate, carbodiimide-modified diphenyl methane diisocyanate, crude diphenyl methane diisocyanate, phenylene diisocyanate, tolylene diisocyanate, and naphthalene diisocyanate; an aliphatic polyisocyanate such as hexamethylene diisocyanate, lysine diisocyanate, xylylene diisocyanate, and tetramethyl xylylene diisocyanate; cyclohexane diisocyanate, dicyclohexyl methane diisocyanate, isophorone diisocyanate, and the like. One type of the polyisocyanate (b2) is able to be independently used, or two or more types thereof are able to be used in combination.

Among the polyisocyanates (b2), a polyisocyanate containing an aromatic polyisocyanate is preferable from the viewpoint of further improving the adhesiveness with respect to the substrate. At this time, it is preferable that the content of the aromatic polyisocyanate in the polyisocyanate (b2) is in a range of 15 to 35 mass %.

The urethane resin (B), for example, is able to be prepared by mixing the polyol (b1) and the polyisocyanate (b2) in the absence of a solvent or in the presence of an organic solvent, and by performing a reaction therebetween at a temperature of 40 to 120° C. for 3 to 20 hours. In addition, at the time of preparing the urethane resin (B), a chain extender may be used, as necessary.

The reaction between the polyol (b1) and the polyisocyanate (b2) is preferably performed at an equivalent ratio [Isocyanate Group/Hydroxyl Group] of the isocyanate group of the polyisocyanate (b2) to the hydroxyl group of the polyol (b1) of 0.5 to 3.5, and is more preferably performed at the equivalent ratio of 0.9 to 2.5.

Examples of the organic solvent which is able to be used at the time of preparing the urethane resin (B) include a ketone solvent such as acetone and methyl ethyl ketone; an ether solvent such as tetrahydrofuran and dioxane; an ester acetate solvent such as ethyl acetate and butyl acetate; a nitrile solvent such as acetonitrile; an amide solvent such as dimethyl formamide and N-methyl pyrrolidone, and the like. One type of the organic solvent is able to be independently used, or two or more types thereof are able to be used in combination.

The weight average molecular weight of the urethane resin (B) which is able to be obtained by the method described above is preferably in a range of 3,000 to 200,000, and is more preferably in a range of 3,000 to 100,000, from the viewpoint of further improving adhesiveness between the substrate and a cured coating film of the active energy ray curable composition.

Examples of the aqueous medium (C) used in the aqueous resin composition of the present invention include water, an organic solvent which is mixed with water, and a mixture thereof. Examples of the organic solvent which is mixed with water include an alcohol solvent such as methanol, ethanol, n-propanol, and isopropanol; a ketone solvent such as acetone and methyl ethyl ketone; polyalkylene glycol such as ethylene glycol, diethylene glycol, and propylene glycol; an alkyl ether solvent such as polyalkylene glycol; a random solvent such as N-methyl-2-pyrrolidone, and the like. One type of the organic solvent which is mixed with water is able to be independently used, or two or more types thereof are able to be used in combination.

In addition, only water or a mixture of water and the organic solvent which is mixed with water is preferable as the aqueous medium (C) used in the aqueous resin composition of the present invention, and only water is more preferable, in consideration of safety or a reduction in a load on the environment.

A ratio of the aqueous medium (C) in the aqueous resin composition of the present invention is preferably in a range of 10 to 90 mass %, and is more preferably in a range of 30 to 70 mass %.

In the aqueous resin composition of the present invention, the vinyl ester resin (A) and the urethane resin (B) are dispersed in the aqueous medium (C). At this time, the vinyl ester resin (A) and the urethane resin (B) may exist in the aqueous medium (C) as a separate resin particle, and it is preferable to use resin particles (D) in which a part or all of the vinyl ester resin (A) presents in particles of the urethane resin (B). More specifically, core-shell type resin particles (D) are preferable in which the vinyl ester resin (A) forms a core portion, and the urethane resin (B) forms a shell portion.

The resin particles (D) are able to be prepared by preparing the vinyl ester resin (A) and the urethane resin (B) in advance, and then, by mixing the vinyl ester resin (A), a basic compound which neutralizes the anionic group of the urethane resin (B), and the aqueous medium (C) into the urethane resin (B).

In a case where an organic solvent is contained in the aqueous resin composition obtained by the method described above, the organic solvent may be removed by a distillation method in order to attain safety and a reduction in a load on the environment. Accordingly, it is possible to obtain an aqueous resin composition in which the resin particles (D) are dispersed in the aqueous medium (C).

A mass ratio [(A)/(B)] of the vinyl ester resin (A) to the urethane resin (B) is preferably in a range of 60/40 to 10/90, and is more preferably in a range of 55/45 to 20/80, from the viewpoint of further improving the adhesiveness with respect to the cured coating film of the active energy ray curable composition. Furthermore, the same range applies to a case where the vinyl ester resin (A) and the urethane resin (B) are used as the resin particles (D).

In addition, a ratio of the total amount of the vinyl ester resin (A) and the urethane resin (B) in the aqueous resin composition of the present invention is preferably in a range of 10 to 90 mass %, and is more preferably in a range of 30 to 70 mass %.

An additive such as a film forming assistant, a curing agent, a cross-linking agent, a plasticizer, an antistatic agent, a wax, a light stabilizer, a fluidity controlling agent, a dye, a leveling agent, a rheology control agent, an ultraviolet absorbent, an antioxidant, a photocatalytic compound, an inorganic pigment, an organic pigment, and an extender pigment; other resins such as a polyester resin, an urethane resin, and an acrylic resin, and the like are able to be mixed into the aqueous resin composition of the present invention, as necessary.

Examples of the cross-linking agent include a melamine compound, an epoxy compound, an oxazoline compound, a carbodiimide compound, an isocyanate compound, and the like. Examples of the melamine compound include an alkylated methylol melamine resin. The alkylated methylol melamine resin, for example, is obtained by allowing a methylolated melamine resin to react with lower alcohol (alcohol having 1 to 6 carbon atoms) such as methyl alcohol and butyl alcohol. Examples of the methylolated melamine resin include a methylol melamine resin having an amino group which is obtained by condensing melamine and formaldehyde, a methylol melamine resin having an imino group, a trimethoxy methylol melamine resin, a hexamethoxy methylol melamine resin, and the like. Among them, the trimethoxy methylol melamine resin and the hexamethoxy methylol melamine resin are preferable. In addition, examples of the alkylated methylol melamine resin include an alkylated methylol melamine resin having an imino group, an alkylated methylol melamine resin having an amino group, and the like.

A laminate of the present invention includes a primer layer formed by using the aqueous resin composition of the present invention described above, and includes a cured coating film formed on the surface of the primer layer by using the active energy ray curable composition.

An active energy ray curable composition which contains a resin having a polymerizable unsaturated group and a monomer having a polymerizable unsaturated group is preferable as the active energy ray curable composition, and it is preferable that the type of the resin having a polymerizable unsaturated group and the monomer having a polymerizable unsaturated group is suitably selected according to properties required for the cured coating film of the active energy ray curable composition.

Examples of the resin having a polymerizable unsaturated group include a urethane (meth)acrylate resin, an unsaturated polyester resin, an epoxy (meth)acrylate resin, a polyester (meth)acrylate resin, an acryl (meth)acrylate resin, a resin having a maleimide group, and the like. One type of the resin having a polymerizable unsaturated group is able to be independently used, or two or more types thereof are able to be used in combination.

In the present invention, "(meth)acrylate" indicates one or both of acrylate and methacrylate, and a "(meth)acryloyl group" indicates one or both of an acryloyl group and a methacryloyl group.

Examples of the urethane (meth)acrylate resin include a resin having an urethane bond obtained by performing a urethanization reaction between an aliphatic polyisocyanate or an aromatic polyisocyanate and (meth)acrylate having a hydroxyl group, and a (meth)acryloyl group, and the like.

Examples of the aliphatic polyisocyanate include tetramethylene diisocyanate, pentamethylene diisocyanate, hexamethylene diisocyanate, heptamethylene diisocyanate, octamethylene diisocyanate, decamethylene diisocyanate, 2-methyl-1,5-pentane diisocyanate, 3-methyl-1,5-pentane diisocyanate, dodecamethylene diisocyanate, 2-methyl pentamethylene diisocyanate, 2,2,4-trimethyl hexamethylene diisocyanate, 2,4,4-trimethyl hexamethylene diisocyanate, isophorone diisocyanate, norbornane diisocyanate, hydrogenated diphenyl methane diisocyanate, hydrogenated tolylene diisocyanate, hydrogenated xylylene diisocyanate, hydrogenated tetramethyl xylylene diisocyanate, cyclohexyl diisocyanate, and the like. In addition, examples of the aromatic polyisocyanate include tolylene diisocyanate, 4,4'-diphenyl methane diisocyanate, xylylene diisocyanate, 1,5-naphthalene diisocyanate, tolidine diisocyanate, p-phenylene diisocyanate, and the like.

Examples of the (meth)acrylate having a hydroxyl group include mono(meth)acrylate of dihydric alcohol such as 2-hydroxy ethyl (meth)acrylate, 2-hydroxy propyl (meth)acrylate, 2-hydroxy butyl (meth)acrylate, 4-hydroxy butyl (meth)acrylate, 1,5-pentane diol mono(meth)acrylate, 1,6-hexanediol mono(meth)acrylate, neopentyl glycol mono(meth)acrylate, and hydroxy pivalic acid neopentyl glycol mono(meth)acrylate; mono(meth)acrylate or di(meth)acrylate of trivalent alcohol such as trimethylol propane di(meth)acrylate, ethoxylated trimethylol propane (meth)acrylate, propoxylated trimethylol propane di(meth)acrylate, glycerin di(meth)acrylate, and bis(2-(meth)acryloyl oxy ethyl)hydroxy ethyl isocyanurate, mono(meth)acrylate and di(meth)acrylate having a hydroxyl group in which a part of an alcoholic hydroxyl group thereof is modified with ε-caprolactone; a compound having a monofunctional hydroxyl group and a tri- or more functional (meth)acryloyl group such as pentaerythritol tri(meth)acrylate, ditrimethylol propane tri(meth)acrylate, and dipentaerythritol penta(meth)acrylate or multifunctional (meth)acrylate having a hydroxyl group in which a part of the compound is further modified with ε-caprolactone; a (meth)acrylate compound having an oxy alkylene chain such as dipropylene glycol mono(meth)acrylate, diethylene glycol mono(meth)acrylate, polypropylene glycol mono(meth)acrylate, and polyethylene glycol mono(meth)acrylate; a (meth)acrylate compound having an oxy alkylene chain of a block structure such as polyethylene glycol-polypropylene glycol mono(meth)acrylate, and polyoxy butylene-polyoxy propylene mono(meth)acrylate; a (meth)acrylate compound having an oxy alkylene chain of a random structure such as poly(ethylene glycol-tetramethylene glycol) mono(meth)acrylate and poly(propylene glycol-tetramethylene glycol) mono(meth)acrylate, and the like.

The unsaturated polyester resin is a curable resin obtained by performing polycondensation with respect to an α,β-unsaturated dibasic acid or an acid anhydride thereof, an aromatic saturated dibasic acid or an acid anhydride thereof, and glycol. Examples of the α,β-unsaturated dibasic acid or the acid anhydride thereof include a maleic acid, a maleic anhydride, a fumaric acid, an itaconic acid, a citraconic acid, a chloromaleic acid, ester thereof, and the like. Examples of the aromatic saturated dibasic acid or the acid anhydride thereof include a phthalic acid, a phthalic anhydride, an isophthalic acid, a terephthalic acid, a nitrophthalic acid, a tetrahydrophthalic anhydride, an endomethylene tetrahydrophthalic anhydride, a halogenated anhydride phthalic acid, ester thereof, and the like. Examples of an aliphatic or alicyclic saturated dibasic acid include an oxalic acid, a malonic acid, a succinic acid, an adipic acid, a sebacic acid, an azelaic acid, a glutaric acid, a hexahydrophthalic anhydride, ester thereof, and the like. Examples of the glycol include ethylene glycol, propylene glycol, diethylene glycol, dipropylene glycol, 1,3-butanediol, 1,4-butanediol, 2-methyl propane-1,3-diol, neopentyl glycol, triethylene glycol, tetraethylene glycol, 1,5-pentane diol, 1,6-hexanediol, bisphenol A, hydrogenated bisphenol A, ethylene glycol carbonate, 2,2-di-(4-hydroxy propoxy diphenyl) propane, and the like, and an oxide such as ethylene oxide and propylene oxide is also able to be used.

Examples of the epoxy (meth)acrylate resin include an epoxy (meth)acrylate resin obtained by allowing a (meth)acrylic acid to react with an epoxy group of an epoxy resin such as a bisphenol A type epoxy resin, a bisphenol F type epoxy resin, a phenol novolak type epoxy resin, and a cresol novolak type epoxy resin.

Examples of the polyester (meth)acrylate resin include a polyester (meth)acrylate resin obtained by allowing a (meth)acrylic acid to react with a hydroxyl group of polyester polyol.

Examples of the acryl (meth)acrylate resin include an acryl (meth)acrylate resin obtained by performing polymerization with respect to glycidyl methacrylate, and as necessary, a (meth)acrylate monomer such as alkyl (meth)acrylate, and by obtaining an acrylic resin having an epoxy group, and then, by allowing a (meth)acrylic acid to react with the epoxy group.

Examples of the resin having a maleimide group include a bifunctional maleimide urethane compound obtained by urethanizing N-hydroxy ethyl maleimide and isophorone diisocyanate, a bifunctional maleimide ester compound obtained by esterifying maleimide acetic acid and polytetramethylene glycol, a tetrafunctional maleimide ester compound obtained by esterifying a maleimide caproic acid and a tetraethylene oxide adduct of pentaerythritol, a multifunctional maleimide ester compound obtained by esterifying maleimide acetate and a polyhydric alcohol compound, and the like.

Examples of the monomer having a polymerizable unsaturated group include aliphatic alkyl (meth)acrylate such as ethylene glycol di(meth)acrylate, diethylene glycol di(meth)acrylate, triethylene glycol di(meth)acrylate, polyethylene glycol di(meth)acrylate having a number average molecular weight of 150 to 1000, propylene glycol di(meth)acrylate, dipropylene glycol di(meth)acrylate, tripropylene glycol di(meth)acrylate, polypropylene glycol di(meth)acrylate having a number average molecular weight of 150 to 1000, neopentyl glycol di(meth)acrylate, 1,3-butanediol di(meth)acrylate, 1,4-butanediol di(meth)acrylate, 1,6-hexanediol di(meth)acrylate, hydroxy pivalic acid ester neopentyl glycol di(meth)acrylate, bisphenol A di(meth)acrylate, trimethylol propane tri(meth)acrylate, trimethylol propane di(meth)acrylate, pentaerythritol tetra(meth)acrylate, pentaerythritol tri(meth)acrylate, dipentaerythritol hexa (meth)acrylate, dipentaerythritol penta(meth)acrylate, dicyclopentenyl (meth)acrylate, methyl (meth)acrylate, propyl (meth)acrylate, butyl (meth)acrylate, t-butyl (meth)acrylate, 2-ethyl hexyl (meth)acrylate, octyl (meth)acrylate, decyl (meth)acrylate, isodecyl (meth)acrylate, lauryl (meth)acrylate, stearyl (meth)acrylate, and isostearyl (meth)acrylate, glycerol (meth)acrylate, 2-hydroxy ethyl (meth)acrylate, 3-chloro-2-hydroxy propyl (meth)acrylate, glycidyl (meth)acrylate, allyl (meth)acrylate, 2-butoxy ethyl (meth)acrylate, 2-(diethyl amino) ethyl (meth)acrylate, 2-(dimethyl amino) ethyl (meth)acrylate, γ-(meth)acryloxy propyl trimethoxy silane, 2-methoxy ethyl (meth)acrylate, methoxy diethylene glycol (meth)acrylate, methoxy dipropylene glycol (meth)acrylate, nonyl phenoxy polyethylene glycol (meth)acrylate, nonyl phenoxy polypropylene glycol (meth)acrylate, phenoxy ethyl (meth)acrylate, phenoxy dipropylene glycol (meth)acrylate, phenoxy polypropylene glycol (meth)acrylate, polybutadiene (meth)acrylate, polyethylene glycol-polypropylene glycol (meth)acrylate, polyethylene glycol-polybutylene glycol (meth)acrylate, polystyryl ethyl (meth) acrylate, benzyl (meth)acrylate, cyclohexyl (meth)acrylate, dicyclopentanyl (meth)acrylate, dicyclopentenyl (meth) acrylate, isobornyl (meth)acrylate, methoxylated cyclododecatriene (meth)acrylate, phenyl (meth)acrylate; a maleimide compound such as maleimide, N-methyl maleimide, N-ethyl maleimide, N-propyl maleimide, N-butyl maleimide, N-hexyl maleimide, N-octyl maleimide, N-dodecyl maleimide, N-stearyl maleimide, N-phenyl maleimide, N-cyclohexyl maleimide, 2-maleimide ethyl-ethyl carbonate, 2-maleimide ethyl-propyl carbonate, N-ethyl-(2-maleimide ethyl) carbamate, N,N-hexamethylene bismaleimide, polypropylene glycol-bis(3-maleimide propyl) ether, bis(2-maleimide ethyl) carbonate, and 1,4-dimaleimide cyclohexane, and the like. One type of the monomer having a polymerizable unsaturated group is able to be independently used, or two or more types thereof are able to be used in combination.

The active energy ray curable composition is able to form the cured coating film by being applied onto the substrate, and then, by being irradiated with an active energy ray. Examples of the active energy ray include ionizing radiation such as an ultraviolet ray, an electron ray, an α ray, a β ray, and a γ ray. In a case where the active energy ray curable composition forms the cured coating film by being irradiated with an ultraviolet ray as the active energy ray, it is preferable that a photopolymerization initiator is added to the active energy ray curable composition, and thus, curing properties are improved. In addition, as necessary, a photosensitizer is further added to the active energy ray curable composition, and thus, the curing properties are also able to be improved. On the other hand, in a case where the active energy ray curable composition forms the cured coating film by being irradiated with an electron ray, an α ray, a β ray, or a γ ray as the active energy ray, the active energy ray curable composition is rapidly cured without using a photopolymerization initiator or a photosensitizer, and thus, it is not necessary that the photopolymerization initiator or the photosensitizer is added to the active energy ray curable composition.

Examples of the photopolymerization initiator include 1-hydroxycyclohexyl phenyl ketone, 2-hydroxy-2-methyl-1-phenylpropan-1-one, 1-[4-(2-hydroxyethoxy)-phenyl]-2-hydroxy-methyl-1-propan-1-one, 2-methyl-1-[4-(methylthio)phenyl]-2-morpholinopropan-1-one, 2-benzyl-2-dimethylamino-1-(4-morpholinophenyl)-butanone, bis(2,6-dimethoxybenzoyl)-2,4,4-trimethyl pentylphosphine oxide, bis(2,4,6-trimethylbenzoyl)-phenyl phosphine oxide, and the like.

Examples of the photosensitizer include an amine compound such as aliphatic amine and aromatic amine, a urea compound such as o-tolylthiourea, a sulfur compound such as sodium diethyldithiophosphate and s-benzylisothiuronium-p-toluene sulfonate, and the like.

Examples of the substrate used in the laminate of the present invention include a metal substrate, a plastic substrate, a glass substrate, a paper substrate, a wood substrate, a fibrous substrate, and the like. Among the substrates, the plastic substrate is preferable in a case of using the aqueous resin composition of the present invention as a primer, in order to improve the adhesiveness between the cured coating film of the active energy ray curable composition and the substrate.

Examples of the material of the plastic substrate include polyester, an acrylic resin (polymethyl methacrylate and the like), polycarbonate, an acrylonitrile-butadiene-styrene copolymer (an ABS resin), a composite resin of an ABS resin and polycarbonate, polystyrene, polyurethane, an epoxy resin, polyvinyl chloride, polyamide, polyolefin (polyethylene, polypropylene, polycycloolefin (COP), and the like), triacetyl cellulose (TAC), and the like.

The aqueous resin composition of the present invention is extremely useful as a primer of a polyester substrate among the plastic substrates. Specific examples of the polyester include polyethylene terephthalate (PET), polybutylene terephthalate (PBT), and the like.

Examples of the plastic substrate include a plastic molding product such as a mobile phone, an electrical home appliance, an automotive interior and exterior material, an OA equipment. In addition, examples of the plastic substrate also include a film substrate using plastic as a material. In a case where the film substrate is used as the substrate of the laminate of the present invention, the laminate is able to be used in an optical film such as an antireflection film, a retardation film, and a prism lens sheet; and a high functional film for food packaging or the like such as aluminum vapor deposited film.

In addition, in a case where the laminate of the present invention is an optical film such as an antireflection film, a retardation film, and a prism lens sheet, the laminate is able to be used as a member of various screen display devices such as a liquid crystal display (LCD), an organic EL display (OLED), and a plasma display (PDP).

The aqueous resin composition of the present invention, for example, is able to form a coating film on the surface of the substrate by being directly applied onto the surface of the substrate, and then, by being dried and cured. A method of curing the aqueous resin composition at normal temperature for approximately 1 to 10 days may be used as a method of drying and curing the aqueous resin composition of the present invention, and a method of heating the aqueous resin composition at a temperature of 100 to 150° C. for approximately 1 to 600 seconds is preferable since the aqueous resin composition is able to be rapidly cured. In addition, in a case where the plastic substrate which is easily deformed or discolored at a comparatively high temperature is used, it is preferable that the aqueous resin composition is heated at a comparatively low temperature of approximately 70 to 100° C.

Examples of a method of applying the aqueous resin composition of the present invention onto the surface of the substrate include a coating method using a gravure coater, a roll coater, a comma coater, a knife coater, an air knife coater, a curtain coater, a kiss coater, a shower coater, a flow coater, a spin coater, dipping, screen printing, a spray, brush coating, an applicator, a bar coater, and the like.

The film thickness of the coating film formed by using the aqueous resin composition of the present invention is able to be suitably adjusted according to application to be used, and in general, it is preferable that the film thickness is in a range of 0.01 to 20 μm.

The laminate of the present invention is able to be obtained by applying the active energy ray curable composition onto the surface of the primer layer which is the coating film of the aqueous resin composition of the present invention obtained as described above, by irradiating the active energy ray curable composition with an active energy ray, and by forming the cured coating film of the active energy ray curable composition. Furthermore, a method identical to a coating method of the aqueous resin composition of the present invention is able to be used as a coating method of the active energy ray curable composition.

EXAMPLES

Hereinafter, the present invention will be specifically described with reference to examples and comparative examples.

Synthesis Example 1: Synthesis of Aromatic Polyester Polyol (1)

26.3 parts of an isophthalic acid, 26.3 parts of a terephthalic acid, 23.5 parts of butanediol, 27.2 parts of neopentyl glycol, and 0.04 parts of dibutyl tin oxide were put into a reaction vessel provided with a thermometer, a nitrogen gas introduction pipe, and a stirrer while introducing nitrogen gas into the reaction vessel, at 180 to 230° C., and then, were subjected to polycondensation reaction at 230° C. for 24 hours until an acid value was less than or equal to 1, and thus, aromatic polyester polyol (1) [an acid value of 0.2, a hydroxyl value of 112.2, and the concentration of an aromatic ring of 3.98 mol/kg] was obtained.

Synthesis Example 2: Synthesis of Aliphatic Polyester Polyol (1)

47.3 parts by mass of an adipic acid, 42.4 parts by mass of hexanediol, 13.9 parts by mass of butanediol, and 0.05 parts by mass of dibutyl tin oxide were put into a reactor provided with a thermometer, a nitrogen gas introduction pipe, and a stirrer while introducing nitrogen gas into the reactor, were subjected to esterification at 180 to 230° C. for 24 hours, and then, were subjected to a polycondensation reaction at 230° C. for 24 hours until an acid value was less than or equal to 1, and thus, aliphatic polyester polyol (1) [an acid value of 0.2, a hydroxyl value of 74.8, and the concentration of an aromatic ring of 0 mol/kg] was obtained.

Synthesis Example 3: Synthesis of Aromatic Polyester Polyol (2)

33.5 parts by mass of an isophthalic acid, 17.8 parts by mass of a sebacic acid, 7.1 parts by mass of an adipic acid, 7.7 parts by mass of ethylene glycol, 25.8 parts by mass of neopentyl glycol, 11.2 parts by mass of butanediol, and 0.05 parts by mass of dibutyl tin oxide were put into a reactor provided with a thermometer, a nitrogen gas introduction pipe, and a stirrer while introducing nitrogen gas into the reactor, were subjected to esterification at 180 to 230° C. for 24 hours, and then, were subjected to a polycondensation reaction at 230° C. for 24 hours until an acid value was less than or equal to 1, and thus, aromatic polyester polyol (2) [an acid value of 0.3, a hydroxyl value of 56.1, and the concentration of an aromatic ring of 2.53 mol/kg] was obtained.

Preparation Example 1: Synthesis of Vinyl Ester Resin (I-1)

68.6 parts by mass of a cresol novolak type epoxy resin ("EPICLON N-673-80M" manufactured by DIC CORPORATION, Solid Content Epoxy Equivalent: 209 g/eq., Nonvolatile Content: 80 mass %, and Solvent: methyl ethyl ketone), 19.5 parts by mass of an acrylic acid, 0.11 parts by mass of methoquinone, and 11.3 parts by mass of methyl ethyl ketone were put into a reaction vessel and were stirred, and thus, were uniformly mixed. Next, 0.55 parts by mass of triphenyl phosphine was added thereto, and a reaction was performed until an acid value was less than or equal to 1.5 at a reaction temperature of 80° C., and thus, a solution of a vinyl ester resin (I-1) having a nonvolatile content of 75 mass % was obtained.

Preparation Example 2: Synthesis of Vinyl Ester Resin (I-2)

66.8 parts by mass of a phenol novolak type epoxy resin ("EPICLON N-740-80M" manufactured by DIC CORPORATION, Solid Content Epoxy Equivalent: 190 g/eq., Nonvolatile Content: 80 mass %, and Solvent: methyl ethyl ketone), 20.9 parts by mass of an acrylic acid, 0.11 parts by mass of methoquinone, and 11.6 parts by mass of methyl ethyl ketone were put into a reaction vessel and were stirred, and thus, were uniformly mixed. Next, 0.54 parts by mass of triphenyl phosphine was added thereto, and a reaction was performed until an acid value was less than or equal to 1.5 at a reaction temperature of 80° C., and thus, a solution of a vinyl ester resin (I-2) having a nonvolatile content of 75 mass % was obtained.

Preparation Example 3: Synthesis of Vinyl Ester Resin (I-3)

68.2 parts by mass of a bisphenol type epoxy resin ("EPICLON N-865-80M" manufactured by DIC CORPORATION, Solid Content Epoxy Equivalent: 205 g/eq., Nonvolatile Content: 80 mass %, and Solvent: methyl ethyl ketone), 19.8 parts by mass of an acrylic acid, 0.11 parts by mass of methoquinone, and 11.4 parts by mass of methyl ethyl ketone were put into a reaction vessel and were stirred, and thus, were uniformly mixed. Next, 0.55 parts by mass of triphenyl phosphine was added thereto, and a reaction was performed until an acid value was less than or equal to 1.5 at a reaction temperature of 80° C., and thus, a solution of a vinyl ester resin (I-3) having a nonvolatile content of 75 mass % was obtained.

Raw materials of the vinyl ester resins (I-1) to (I-3) synthesized in Preparation Examples 1 to 3 are shown in Table 1.

TABLE 1

| | | Preparation Example 1 | Preparation Example 2 | Preparation Example 3 |
|---|---|---|---|---|
| | Vinyl Ester Resin | I-1 | I-2 | I-3 |
| Composition (Parts by Mass) | EPICLON N-673-80M | 68.6 | | |
| | EPICLON N-740-80M | | 66.8 | |
| | EPICLON | | | 68.2 |

TABLE 1-continued

|  | Preparation Example 1 | Preparation Example 2 | Preparation Example 3 |
|---|---|---|---|
| N-865-80M |  |  |  |
| Acrylic Acid | 19.5 | 20.9 | 19.8 |
| Methoquinone | 0.11 | 0.11 | 0.11 |
| Triphenyl Phosphine | 0.55 | 0.54 | 0.55 |
| Methyl Ethyl Ketone | 11.3 | 11.6 | 11.4 |
| Nonvolatile Content (Mass %) | 75 | 75 | 75 |
| Equivalent of Unsaturated Group (g/eq) | 283 | 264 | 279 |

Preparation Example 4: Synthesis of Urethane Resin Having Hydrophilic Group (II-1)

100.0 parts by mass of the aromatic polyester polyol (1) obtained in Synthesis Example 1 was dehydrated at 100° C. under reduced pressure in a reaction vessel, and then, was cooled to 80° C., and after that, 111.0 parts by mass of methyl ethyl ketone was added and stirred, and thus, was uniformly mixed. Next, 8.1 parts by mass of a 2,2-dimethylol propionic acid was added, and then, 28.0 parts by mass of tolylene diisocyanate and 0.08 parts by mass of dibutyl tin dilaurate were added, and a reaction was performed at 80° C. for 12 hours, and thus, a urethanization step was performed. It was confirmed that an isocyanate value was less than or equal to 0.1%, 0.3 parts by mass of n-butanol was added, and a reaction was performed for 2 hours, and then, was cooled to 50° C., and thus, a solution of a urethane resin having a hydrophilic group (II-1) having a nonvolatile content of 55 mass % was obtained.

Preparation Example 5: Synthesis of Urethane Resin Having Hydrophilic Group (II-2)

100 parts by mass of the aliphatic polyester polyol (1) obtained in Synthesis Example 2 and 4.4 parts by mass of the polyester polyol obtained in Synthesis Example 1 were dehydrated at 100° C. under reduced pressure in a reaction vessel, and then, was cooled to 80° C., and after that, 274.9 parts of methyl ethyl ketone was added and stirred, and thus, was uniformly mixed. Next, 117.8 parts by mass of glycol (Hydroxyl Value=280) in which 2 moles of propylene oxide was added to bisphenol A, 20.1 parts by mass of a 2,2-dimethylol propionic acid, and 2.3 parts by mass of cyclohexane dimethanol were added, and then, 92.6 parts by mass of tolylene diisocyanate and 0.08 parts by mass of dibutyl tin dilaurate were added, and a reaction was performed at 80° C. for 12 hours, and thus, a urethanization step was performed. It was confirmed that an isocyanate value was less than or equal to 0.1%, 1 part of methanol was added, and reaction was performed for 2 hours, and then, was cooled to 50° C., and thus, a solution of a urethane resin having a hydrophilic group (II-2) having a nonvolatile content of 55 mass % was obtained.

Preparation Example 6: Synthesis of Urethane Resin Having Hydrophilic Group (II-3)

100 parts by mass of the aromatic polyester polyol (2) obtained in Synthesis Example 3 was dehydrated at 100° C. under reduced pressure in a reaction vessel, and then, was cooled to 80° C., and after that, 114.9 parts by mass of methyl ethyl ketone was added and stirred, and was uniformly mixed. Next, 8.8 parts by mass of a 2,2-dimethylol propionic acid and 4.1 parts by mass of 1,4-butanediol were added, and then, 28.1 parts by mass of tolylene diisocyanate and 0.08 parts by mass of dibutyl tin dilaurate were added, and a reaction was performed at 80° C. for 12 hours, and thus, a urethanization step was performed. It was confirmed that an isocyanate value was less than or equal to 0.1%, 0.4 parts by mass of 1,3-butanediol was added, and a reaction was performed for 2 hours, and then, was cooled to 50° C., and thus, a solution of a urethane resin having a hydrophilic group (III-3) having a nonvolatile content of 55 mass % was obtained.

Example 1: Preparation of Aqueous Resin Composition (III-1)

66.7 parts by mass (50 parts by mass as the vinyl ester resin (II-1)) of the solution of the vinyl ester resin (I-1) having a nonvolatile content of 75 mass % obtained in Preparation Example 1 and 3.6 parts by mass of triethyl amine were added to 90.9 parts by mass (50 parts by mass as the urethane resin (II-1)) of the solution of the urethane resin having a hydrophilic group (II-1) having a nonvolatile content of 55 mass % obtained in Preparation Example 4, and 150 parts by mass of ion exchange water was slowly added, and thus, solubilization was performed. Next, methyl ethyl ketone was removed at 30 to 50° C. under reduced pressure, and thus, an aqueous resin composition (III-1) having a nonvolatile content of 40 mass % was obtained.

Examples 2 to 5: Adjustment of Aqueous Resin Compositions (III-2) to (III-5)

Aqueous resin compositions (III-2) to (III-5) having a nonvolatile content of 40 mass % were obtained by the same method as that in Example 1 except that the compounding amounts in terms of the nonvolatile content of the urethane resin having a hydrophilic group (II-1) obtained in Preparation Example 4 and the vinyl ester resin (I-1) obtained in Preparation Example 1 were changed as shown in Table 2.

Example 6: Preparation of Aqueous Resin Composition (III-6)

An aqueous resin composition (III-6) having a nonvolatile content of 40 mass % was obtained by the same method as that in Example 1 except that the vinyl ester resin (I-2) obtained in Preparation Example 2 was used instead of the urethane resin having a hydrophilic group (II-1) used in Preparation Example 4.

Example 7: Preparation of Aqueous Resin Composition (III-7)

An aqueous resin composition (III-7) having a nonvolatile content of 40 mass % was obtained by the same method as that in Example 1 except that the vinyl ester resin (I-3) obtained in Preparation Example 3 was used instead of the urethane resin having a hydrophilic group (II-1) used in Preparation Example 4.

Example 8: Preparation of Aqueous Resin Composition (III-8)

66.7 parts by mass (50 parts by mass as the vinyl ester resin (II-1)) of the solution of the vinyl ester resin (I-1) having a nonvolatile content of 75 mass % obtained in Preparation Example 1 and 3.0 parts by mass of triethyl amine were added to 90.9 parts by mass (50 parts by mass as the urethane resin (II-2)) of the solution of the urethane resin having a hydrophilic group (II-2) having a nonvolatile content of 55 mass % obtained in Preparation Example 5, and 150 parts by mass of ion exchange water was slowly added, and thus, solubilization was performed. Next, methyl ethyl ketone was removed at 30 to 50° C. under reduced pressure, and thus, a composite aqueous resin composition (III-8) having a nonvolatile content of 40 mass % was obtained.

Example 9: Preparation of Aqueous Resin Composition (III-9)

66.7 parts by mass (50 parts by mass as the vinyl ester resin (II-1)) of the solution of the vinyl ester resin (I-1) having a nonvolatile content of 75 mass % obtained in Preparation Example 1 and 3.6 parts by mass of triethyl amine were added to 90.9 parts by mass (50 parts by mass as the urethane resin (II-3)) of the solution of the urethane resin having a hydrophilic group (II-3) having a nonvolatile content of 55 mass % obtained in Preparation Example 6, and 150 parts by mass of ion exchange water was slowly added, and thus, solubilization was performed. Next, methyl ethyl ketone was removed at 30 to 50° C. under reduced pressure, and thus, a composite aqueous resin composition (III-9) having a nonvolatile content of 40 mass % was obtained.

The compositions of the aqueous resin compositions (III-1) to (III-9) obtained in Examples 1 to 9 are shown in Table 2. Furthermore, the composition in the table indicates a nonvolatile content (the amount of only a resin).

Preparation Example 2: Preparation of Ultraviolet Ray Curable Composition (UV-2)

50 parts by mass of an epoxy acrylate resin ("Unidic V-5500" manufactured by DIC CORPORATION), 50 parts by mass of tripropylene glycol diacrylate, and 3 parts by mass of a photopolymerization initiator ("Irgacure 184" manufactured by BASF SE) were mixed, and thus, an ultraviolet ray curable composition (UV-2) was obtained.

Example 10: Preparation of Laminate (1)

100 parts by mass of the aqueous resin composition (III-1) obtained in Example 1, 5 parts by mass of a melamine cross-linking agent ("Beckamine M-3" manufactured by DIC CORPORATION), and 185 parts by mass of ion exchange water were mixed, and thus, a primer (P-1) was obtained. Next, the primer (P-1) obtained as described above was applied onto the surface of a film substrate (a thickness of 125 μm) of polyethylene terephthalate (hereinafter, simply referred to as "PET") such that the film thickness after being dried was approximately 1 μm and was heated at 150° C. for 5 minutes, and thus, a primer layer was formed on the surface of the substrate.

The ultraviolet ray curable composition (UV-1) obtained in Preparation Example 1 was applied onto the surface of the primer layer such that the film thickness was 30 μm, and the coating surface was irradiated with an ultraviolet ray at irradiation dose of 400 mJ/cm$^2$ by using a high pressure mercury lamp as a light source, and thus, a laminate (1) including the primer layer on the surface of the substrate, and a cured coating film (hereinafter, simply referred to as

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
| Aqueous Resin Composition |  | III-1 | III-2 | III-3 | III-4 | III-5 | III-6 | III-7 | III-8 | III-9 |
| Composition (Parts by mass) | Urethane Resin Having Hydrophilic Group (II-1) | 50 | 60 | 70 | 30 | 20 | 50 | 50 |  |  |
|  | Urethane Resin Having Hydrophilic Group (II-2) |  |  |  |  |  |  |  | 50 |  |
|  | Urethane Resin Having Hydrophilic Group (II-3) |  |  |  |  |  |  |  |  | 50 |
|  | Vinyl Ester Resin (I-1) | 50 | 40 | 30 | 70 | 80 |  |  | 50 | 50 |
|  | Vinyl Ester Resin (I-2) |  |  |  |  |  | 50 |  |  |  |
|  | Vinyl Ester Resin (I-3) |  |  |  |  |  |  | 50 |  |  |

Preparation Example 1: Preparation of Ultraviolet Ray Curable Composition (UV-1)

50 parts by mass of a urethane acrylate resin ("Unidic V-4260" manufactured by DIC CORPORATION), 50 parts by mass of tripropylene glycol diacrylate, and 3 parts by mass of a photopolymerization initiator ("Irgacure 184" manufactured by BASF SE, 1-hydroxy cyclohexyl phenyl ketone) were mixed, and thus, an ultraviolet ray curable composition (UV-1) was obtained.

a "UV coating film") of an ultraviolet ray curable composition on the surface of the primer layer was obtained.

Example 11: Preparation of Laminate (2)

A laminate (2) was obtained by the same method as that in Example 10 except that the ultraviolet ray curable composition (UV-2) obtained in Preparation Example 2 was used instead of the ultraviolet ray curable composition (UV-1) used in Example 10.

Examples 12 to 19: Preparation of Laminates (3) to (10)

Laminates (3) to (10) were obtained by the same method as that in Example 10 except that primers (P-2) to (P-9) were used by being prepared by using the aqueous resin compositions (III-2) to (III-9) obtained in Examples 2 to 9 instead of the aqueous resin composition (III-1) used in Example 10, and the ultraviolet ray curable composition (UV-2) was used instead of the ultraviolet ray curable composition (UV-1) used in Example 10.

Example 20: Preparation of Laminate (11)

A laminate (11) was obtained by the same method as that in Example 10 except that a primer (P-10) was used by being prepared by mixing 100 parts by mass of the aqueous resin composition (III-1) obtained in Example 1, 3 parts by mass of an epoxy cross-linking agent ("CR-5L" manufactured by DIC CORPORATION), and 185 parts by mass of ion exchange water, and the ultraviolet ray curable composition (UV-2) was used instead of an ultraviolet ray curable composition (UV-1) used in Example 10.

The following evaluation of adhesiveness was performed by using the aqueous resin compositions and the laminates obtained in the examples and the comparative examples described above.

[Evaluation Method of Adhesiveness (Initial) Between Substrate and Primer Layer]

The primer was applied onto the surface of a substrate having a film thickness of 125 μm which was formed of polyethylene terephthalate such that the film thickness after being dried was approximately 1 μm and was heated at 150° C. for 5 minutes, and thus, a test plate formed of a member in which the primer layer was laminated on the surface of the substrate was prepared.

Adhesive tape having a width of 24 mm manufactured by NICHIBAN CO., LTD. was stuck to the surface of the primer layer of the test plate prepared by the method described above.

Next, the adhesive tape was pulled in a perpendicular direction with respect to the primer layer, and a state of the surface of the primer layer when the adhesive tape was peeled off from the surface of the primer layer was visually evaluated according to the following evaluation criteria.

A: The primer layer was not peeled off from the surface of the substrate constituting the test plate at all.

B: Only a part of the primer layer was peeled off from the surface of the substrate constituting the test plate, but the area which caused peel-off was less than 10% with respect to the entire area of a film constituting the test plate.

C: The primer layer in a range of greater than or equal to 10% and less than 50% with respect to the area of the primer layer constituting the test plate was peeled off from the surface of the substrate constituting the test plate.

D: The primer layer in a range of greater than or equal to 50% with respect to the entire area of the primer layer constituting the test plate was peeled off from the surface of the substrate constituting the test plate.

[Evaluation Method of Adhesiveness (Initial) Between Primer Layer and UV Coating Film]

Adhesive tape having a width of 24 mm manufactured by NICHIBAN CO., LTD. was stuck to the surface of a UV coating film constituting the laminate obtained in the example and the comparative example.

Next, the adhesive tape was pulled in a perpendicular direction with respect to the UV coating film, and a state of the surface of the UV coating film when the adhesive tape was peeled off from the surface of the UV coating film was visually evaluated according to the following evaluation criteria.

A: The UV coating film was not peeled off from the surface of the substrate constituting the laminate at all.

B: Only a part of the UV coating film was peeled off from the surface of the substrate constituting the laminate, but the area which causes peeling-off was less than 10% with respect to the entire area of the UV coating film constituting the laminate.

C: The UV coating film in a range of greater than or equal to 10% and less than 50% with respect to the area of the UV coating film constituting the laminate was peeled off from the surface of the substrate constituting the laminate.

D: The UV coating film in a range of greater than or equal to 50% with respect to the entire area of the UV coating film constituting the laminate was peeled off from the surface of the substrate constituting the laminate.

[Adhesiveness (after Durability Test) Between Primer Layer and UV Coating Film]

The laminate obtained as described above was put into a high temperature humidistat of a temperature of 60° C. and a relative humidity of 90% for 50 hours. After that, the laminate was taken out, and the adhesiveness between the primer layer and the UV coating film was evaluated by the same method as that in [Evaluation Method of Adhesiveness (Initial) between Primer Layer and UV Coating Film] described above.

[Evaluation Method of Film Forming Properties]

The primer was applied onto the surface of a substrate having a film thickness of 125 μm which was formed of polyethylene terephthalate, such that the film thickness at the time of being dried was approximately 1 μm and was heated at 150° C. for 5 minutes, and thus, the primer layer was formed on the surface of the substrate.

A: When the surface of the primer layer was visually observed, the surface was transparent.

B: When the surface of the primer layer was visually observed, the surface was transparent but a crack was confirmed.

C: When the surface of the primer layer was visually observed, a crack occurred as being whitened, and a part of the primer layer was easily peeled off from the polyethylene terephthalate substrate.

The substrate, the primer, and the ultraviolet ray curable composition used in the laminates (1) to (11) obtained in Examples 10 to 20, and the evaluation results are shown in Table 3.

TABLE 3

|  | Example 10 | Example 11 | Example 12 | Example 13 | Example 14 | Example 15 |
|---|---|---|---|---|---|---|
| Laminate | (1) | (2) | (3) | (4) | (5) | (6) |
| Substrate | PET | PET | PET | PET | PET | PET |

TABLE 3-continued

| | Primer | P-1 | P-1 | P-2 | P-3 | P-4 | P-5 |
|---|---|---|---|---|---|---|---|
| | Ultraviolet Ray Curable Composition | UV-1 | UV-2 | UV-2 | UV-2 | UV-2 | UV-2 |
| Evaluation Result | Adhesiveness (Initial) between Substrate and Primer Layer | A | A | A | A | C | B |
| | Adhesiveness (Initial) between Primer Layer and UV Coating Film | A | A | A | B | B | B |
| | Adhesiveness (after Durability Test) between Primer Layer and UV Coating Film | A | A | B | B | C | C |
| | Film Forming Properties | A | A | A | A | A | A |

| | | Example 16 | Example 17 | Example 18 | Example 19 | Example 20 |
|---|---|---|---|---|---|---|
| | Laminate | (7) | (8) | (9) | (10) | (11) |
| | Substrate | PET | PET | PET | PET | PET |
| | Primer | P-6 | P-7 | P-8 | P-9 | P-10 |
| | Ultraviolet Ray Curable Composition | UV-2 | UV-2 | UV-2 | UV-2 | UV-2 |
| Evaluation Result | Adhesiveness (Initial) between Substrate and Primer Layer | A | B | A | A | A |
| | Adhesiveness (Initial) between Primer Layer and UV Coating Film | A | B | A | B | A |
| | Adhesiveness (after Durability Test) between Primer Layer and UV Coating Film | B | B | B | C | A |
| | Film Forming Properties | A | B | A | A | A |

Synthesis Example 4: Synthesis of Aliphatic Polyester Polyol (2)

63.1 parts by mass of an adipic acid, 39.9 parts by mass of ethylene glycol, and 0.005 parts by mass of dibutyl tin oxide were put into a reactor provided with a thermometer, a nitrogen gas introduction pipe, and a stirrer while introducing nitrogen gas into the reactor, were subjected to esterification at 180 to 230° C. for 24 hours, and were subjected to a polycondensation reaction at 230° C. for 24 hours until an acid value was less than or equal to 1, and thus, aliphatic polyester polyol (2) [an acid value of 0.3 and a hydroxyl value of 56.1] was obtained.

Preparation Example 7: Synthesis of Urethane Resin Having Hydrophilic Group (II')

100 parts by mass of the aliphatic polyester polyol (2) obtained in Synthesis Example 4 was dehydrated at 100° C. under reduced pressure in a reaction vessel, and then, was cooled to 80° C., and after that, 114.9 parts by mass of methyl ethyl ketone was added and stirred, and thus, was uniformly mixed. Next, 8.8 parts by mass of a 2,2-dimethylol propionic acid was added, and then, 28.1 parts by mass of tolylene diisocyanate was added, and a reaction was performed at 80° C. for 12 hours, and thus, a urethanization step was performed. It was confirmed that an isocyanate value was less than or equal to 0.1%, 0.4 parts by mass of n-butanol was added, and a reaction was performed for 2 hours, and then, was cooled to 50° C., and thus, a solution of a urethane resin having a hydrophilic group (II') was obtained.

Comparative Example 1: Synthesis of Aqueous Resin Composition (III')

66.7 parts by mass (50 parts by mass as the vinyl ester resin (I-1)) of the solution of the vinyl ester resin (I-1) having a nonvolatile content of 75 mass % obtained in Preparation Example 1 and 3.0 parts by mass of triethyl amine were added to 90.9 parts by mass (50 parts by mass as the urethane resin (II')) of the solution of the urethane resin having a hydrophilic group (II') having a nonvolatile content of 55 mass % obtained in Preparation Example 7, and 150 parts by mass of ion exchange water was slowly added, and thus, solubilization was performed. Next, methyl ethyl ketone was removed at 30 to 50° C. under reduced pressure, and thus, an aqueous resin composition (III') having a nonvolatile content of 40 mass % was obtained.

Comparative Example 2: Preparation of Laminate (R1)

100 parts by mass of the aqueous resin composition (III') obtained in Comparative Example 1, 5 parts by mass of Beckamine M-3 (a melamine cross-linking agent manufactured by DIC CORPORATION), and 185 parts by mass of ion exchange water were mixed, and thus a primer (P') was obtained. Next, primer (P') obtained as described above was applied onto the surface of a PET film substrate (a thickness of 125 μm) such that the film thickness after being dried was approximately 1 μm and was heated at 150° C. for 5 minutes, and thus, a primer layer was formed on the surface of the substrate.

The ultraviolet ray curable composition (UV-1) obtained in Preparation Example 1 was applied onto the surface of the primer layer such that the film thickness was 15 μm, and the coating surface was irradiated with an ultraviolet ray at irradiation dose of 0.5 J/cm$^2$ by using a high pressure mercury lamp as a light source, and thus, a laminate (R1) including the primer layer on the surface of the substrate, and a cured coating film of an ultraviolet ray curable composition on the surface of the primer layer was obtained.

Comparative Example 3: Preparation of Laminate (R2)

A laminate (R2) was obtained by the same method as that in Example 10 except that the ultraviolet ray curable composition (UV-2) obtained in Preparation Example 2 was used instead of the ultraviolet ray curable composition (UV-1) used in Example 10.

The substrate, the primer, and the ultraviolet ray curable composition used in the laminates (R1) and (R2) obtained in Comparative Examples 2 and 3, and the evaluation results are shown in Table 4.

TABLE 4

|  |  | Comparative Example 2 | Comparative Example 3 |
|---|---|---|---|
|  | Laminate | R1 | R2 |
|  | Substrate | PET | PET |
|  | Primer | P' | P' |
|  | Ultraviolet Ray Curable Composition | UV-1 | UV-2 |
| Evaluation Result | Adhesiveness (Initial) between Substrate and Primer Layer | C | C |
|  | Adhesiveness (Initial) between Primer Layer and UV Coating Film | D | D |
|  | Adhesiveness (after Durability Test) between Primer Layer and UV Coating Film | D | D |
|  | Film Forming Properties | AB | A |

From the evaluation results shown in Table 3, it was confirmed that the primer layer formed by using the aqueous resin composition of the present invention had excellent adhesiveness with respect to the substrate and excellent adhesiveness with respect to the cured coating film of the active energy ray curable composition.

In contrast, the evaluation result shown in Table 4 is an example using the aqueous resin composition obtained in Comparative Example 1 which does not have an aromatic ring but has a urethane resin. It was confirmed that the primer layer formed of the aqueous resin composition of Comparative Example 1 had insufficient adhesiveness with respect to the substrate and significantly insufficient adhesiveness with respect to the cured coating film of the active energy ray curable composition.

The invention claimed is:

1. An aqueous resin composition in which a vinyl ester resin (A) and a urethane resin (B) having an aromatic ring are dispersed in an aqueous medium (C), wherein
the vinyl ester resin (A) is one obtained by allowing at least one epoxy resin (a1) selected from the group consisting of a novolak type epoxy resin and a bisphenol type epoxy resin to react with a compound (a2) having an acid group and a polymerizable unsaturated group,
the urethane resin (B) is one obtained by allowing polyol (b1) containing polyol (b1-1) having an aromatic ring and polyol (b1-2) having a hydrophilic group to react with a polyisocyanate (b2)
an equivalent of the polymerizable unsaturated group of the vinyl ester resin (A) is in a range of 250 to 2,000 g/eq., and
an epoxy equivalent of the epoxy resin (a1) is in a range of 150 to 2,000 g/eq.

2. The aqueous resin composition according to claim 1, wherein a concentration of the aromatic ring in the polyol (b1-1) is in a range of 1.5 to 8 mol/kg.

3. The aqueous resin composition according to claim 1, wherein the polyol (b1-1) having an aromatic ring is a polyol containing at least one of aromatic polyester polyol (b1-a) and an alkylene oxide adduct (b1-b) of bisphenol A.

4. The aqueous resin composition according to claim 1, wherein a ratio of the polyol (b1-1) having an aromatic ring contained in the polyol (b1) is in a range of 40 to 98 mass %.

5. The aqueous resin composition according to claim 1, wherein the polyisocyanate (b2) contains an aromatic polyisocyanate.

6. The aqueous resin composition according to claim 1, wherein the compound (a2) is an acrylic acid or a methacrylic acid.

7. The aqueous resin composition according to claim 1, wherein a part or all of the vinyl ester resin (A) present in particles of the urethane resin (B) to thereby form resin particles (D).

8. The aqueous resin composition according to claim 1, wherein a mass ratio [(A)/(B)] of the vinyl ester resin (A) to the urethane resin (B) is in a range of 60/40 to 10/90.

9. A laminate, comprising:
a primer layer formed by using the aqueous resin composition according to claim 1 on a surface of a substrate; and
a cured coating film formed by using an active energy ray curable composition on a surface of the primer layer.

10. The laminate according to claim 9,
wherein the active energy ray curable resin composition contains a resin having a polymerizable unsaturated group and a monomer having a polymerizable unsaturated group.

11. An image display device, comprising:
the laminate according to claim 9.

* * * * *